US007805843B2

(12) United States Patent
Landsberger et al.

(10) Patent No.: US 7,805,843 B2
(45) Date of Patent: Oct. 5, 2010

(54) EATING UTENSIL

(75) Inventors: David Landsberger, Caldwell, NJ (US); Paul Thom, Butler, NJ (US); Kathleen O'Neill, Bloomingdale, NJ (US); Francis Gomes, Lincoln Park, NJ (US)

(73) Assignee: Bel-Art Products, Inc., Pequannock, NJ (US)

(*) Notice: Subject to any disclaimer, the term of this patent is extended or adjusted under 35 U.S.C. 154(b) by 363 days.

(21) Appl. No.: 11/893,657

(22) Filed: Aug. 17, 2007

(65) Prior Publication Data

US 2008/0066317 A1 Mar. 20, 2008

Related U.S. Application Data

(60) Provisional application No. 60/844,921, filed on Sep. 15, 2006.

(51) Int. Cl.
*A47J 43/28* (2006.01)

(52) U.S. Cl. ............................ 30/147; 30/142; 30/322; 30/324

(58) Field of Classification Search .................. 30/169, 30/142, 147, 124, 125, 322–324, 340; 15/143.1, 15/236.01
See application file for complete search history.

(56) References Cited

U.S. PATENT DOCUMENTS 4,823,419 A * 4/1989 Stimpson ...................... 7/113
4,922,611 A * 5/1990 Levy ........................... 30/147
4,989,320 A * 2/1991 Borkott et al. ............ 30/272.1
5,327,650 A * 7/1994 Rojas .......................... 30/147
6,055,733 A 5/2000 Chen
6,237,226 B1 * 5/2001 Huang ......................... 30/322
6,266,885 B1 * 7/2001 Stein et al. .................... 30/342
6,675,483 B2 * 1/2004 Bond et al. ................... 30/142
2002/0073554 A1 6/2002 Chen

FOREIGN PATENT DOCUMENTS

DE 20 2005 000 220 U1 4/2005
FR 963021 6/1950
GB 1441640 7/1976
GB 394031 6/1993

OTHER PUBLICATIONS

Maddak Inc. Catalog No. 0605 pp. 43-46, and 51-54.

* cited by examiner

*Primary Examiner*—Phong H Nguyen
(74) *Attorney, Agent, or Firm*—Lowenstein Sandler PC

(57) ABSTRACT

A utensil for a manually impaired user includes a utensil insert, such as a fork, spoon, knife, tool or other object, and a handle for receiving the utensil insert so that a portion of the utensil insert extends outwardly from the handle. The handle has first and second handle sections that are removably connected together. The first handle section includes a first receptacle and a first projection spaced from the first receptacle while the second handle section includes a second receptacle and a second projection spaced from the second receptacle. The first receptacle is adapted to receive the second projection and the second receptacle is adapted to receive the first projection when the first and second handle sections are connected together.

16 Claims, 6 Drawing Sheets

EATING UTENSIL

CROSS-REFERENCE TO RELATED APPLICATIONS

THIS APPLICATION CLAIMS THE BENEFIT OF U.S. PROVISIONAL APPLICATION Ser. No. 60/844,921 FILED ON Sep. 15, 2006, THE DISCLOSURE OF WHICH IS HEREBY INCORPORATED BY REFERENCE.

BACKGROUND OF INVENTION

The present invention relates generally to implements provided to enhance the grasping ability of a person with limited dexterity, and more particularly to eating utensils adapted for use by manually challenged individuals such as small children, handicapped, arthritic persons and others with limited manual dexterity.

Devices for enhancing the ability of a person to hold and grip an object, tool, or implement are well known in the art. Such devices are typically used by people who have limited dexterity or strength. Among such individuals are persons with arthritis or someone who has suffered injury to the hands, or someone born with a physical disability. These types of devices are also used by children, particularly as they learn to use table utensils, and also by other persons to facilitate the holding of many kinds of objects which are particularly tiresome to hold for an extended period of time.

Despite the number of devices on the market, there remains a need for an implement handle which can be used on with a plurality of various types of utensils, tools, and devices, enabling the user to firmly grasp the handle, and which is comfortable and easy to hold, especially in view of the user's physical limitations.

BRIEF SUMMARY OF THE INVENTION

According to one aspect of the invention, a utensil for a manually impaired user includes a first utensil insert and a handle for receiving the first utensil insert so that a portion of the first utensil insert extends outwardly from the handle. The handle has first and second handle sections that are removably connected together. The first handle section includes a first receptacle and a first projection spaced from the first receptacle. The second handle section includes a second receptacle and a second projection spaced from the second receptacle. The first receptacle is adapted to receive the second projection and the second receptacle is adapted to receive the first projection when the first and second handle sections are connected together.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

Figure 1:
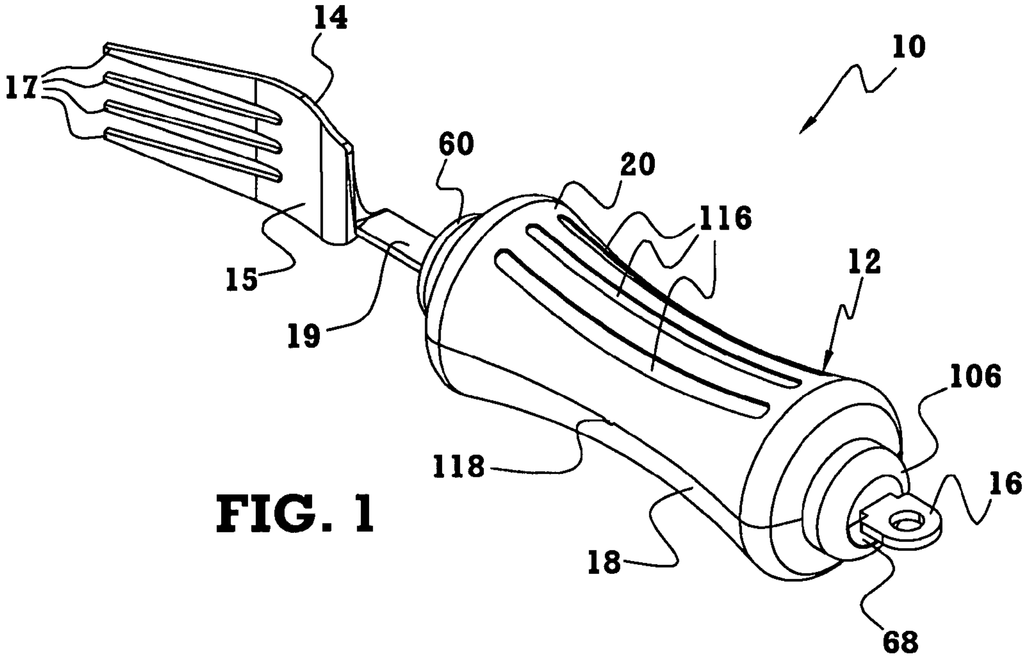
FIG. 1 is a rear isometric view of an eating utensil in accordance with the present invention.
Figure 2:
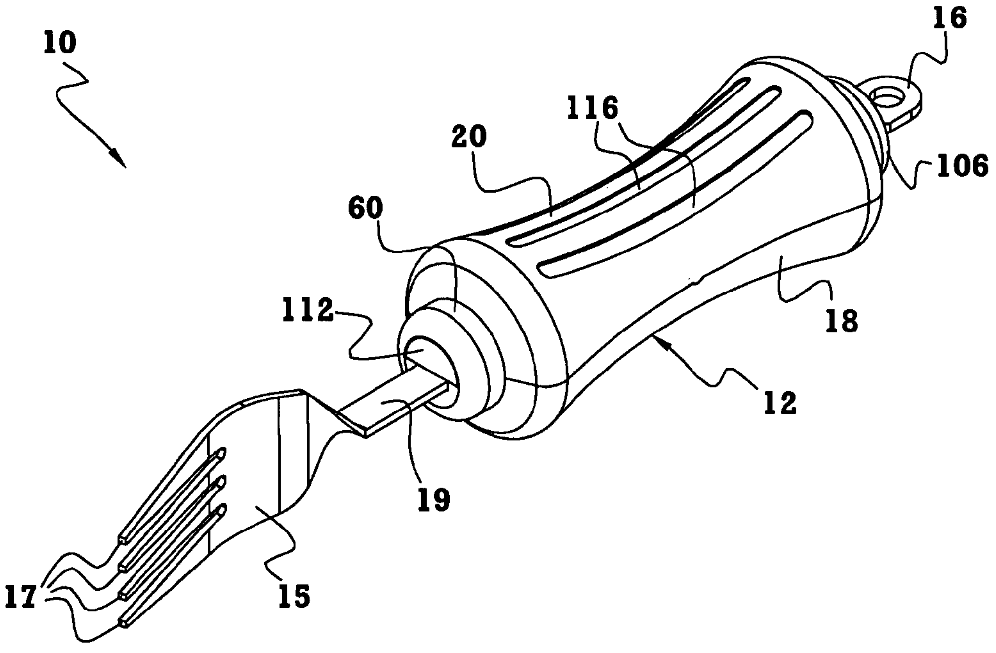
FIG. 2 is a front isometric view of the eating utensil.

It is noted that the drawings are intended to depict only typical or exemplary embodiments of the invention and thus may not be necessarily to scale. Accordingly, the drawings should not be considered as limiting the scope of the invention. The invention will now be described in greater detail with reference to the accompanying drawings.

DETAILED DESCRIPTION OF THE INVENTION

Referring to the drawings, and to FIGS. 1-4 in particular, a utensil 10 in accordance with an exemplary embodiment of the present invention is illustrated. The utensil 10 preferably includes a handle 12, a utensil insert 14 extending forwardly of the handle, and a tab insert 16 extending rearwardly from the handle. The utensil insert 14 may be in the form of a fork, spoon, knife or other object to facilitate food consumption and selection. The shape and relative size of the handle 12 serves to increase the gripping area over conventional eating utensils and thus facilitates manipulation of the eating utensil 10 especially by individuals with disabilities and limited hand dexterity. Although the present invention is described by way of various eating utensils, it will be understood that other objects, tools or implements can be modified in a similar manner, so as to be used in connection with the handle of the invention without departing from the spirit and scope of the present invention.

The utensil insert 14 as shown is in the form of a fork with a plate member 15 with curved tines 17 extending forwardly from the plate member and a stem 19 extending rearwardly from the plate member. A plurality of notches 21 and 23 are formed in the longitudinal edges 25 and 27, respectively, of the stem 19 for a purpose to be described in greater detail below. Preferably, the plate member 15 is angled approximately 90 degrees with respect to a plane of the stem 19. However, it will be understood that the plate member and respective stem may be oriented at other angles or may extend in the same direction depending on the particular requirements or needs of the end user.

The tab or axiliary insert 16 preferably includes a stem 33, a cross member 27 connected to one end of the stem 33, and a ring member 29 extending from the opposite end of the stem 33. The ring member preferably includes an opening 31 through which a chain, strap or cord (not shown) can be inserted for securing the eating utensil 10 to a user's wrist or arm, other eating utensils, a storage hanger, and so on.

The handle 12 is preferably of semi-hourglass shape to facilitate grasping and manipulation of the eating utensil 10 and preferably includes a first handle section 18 and a second handle section 20 adapted to form together a hollow interior for receiving and holding the respective utensil insert and the tab insert 16, as will be described in greater detail below. Preferably, the first and second handle sections 18, 20 as well as the inserts 14, 16 are removably connected together for replacing one or both inserts with different inserts and/or for cleaning the eating utensil 10.

Figure 3:
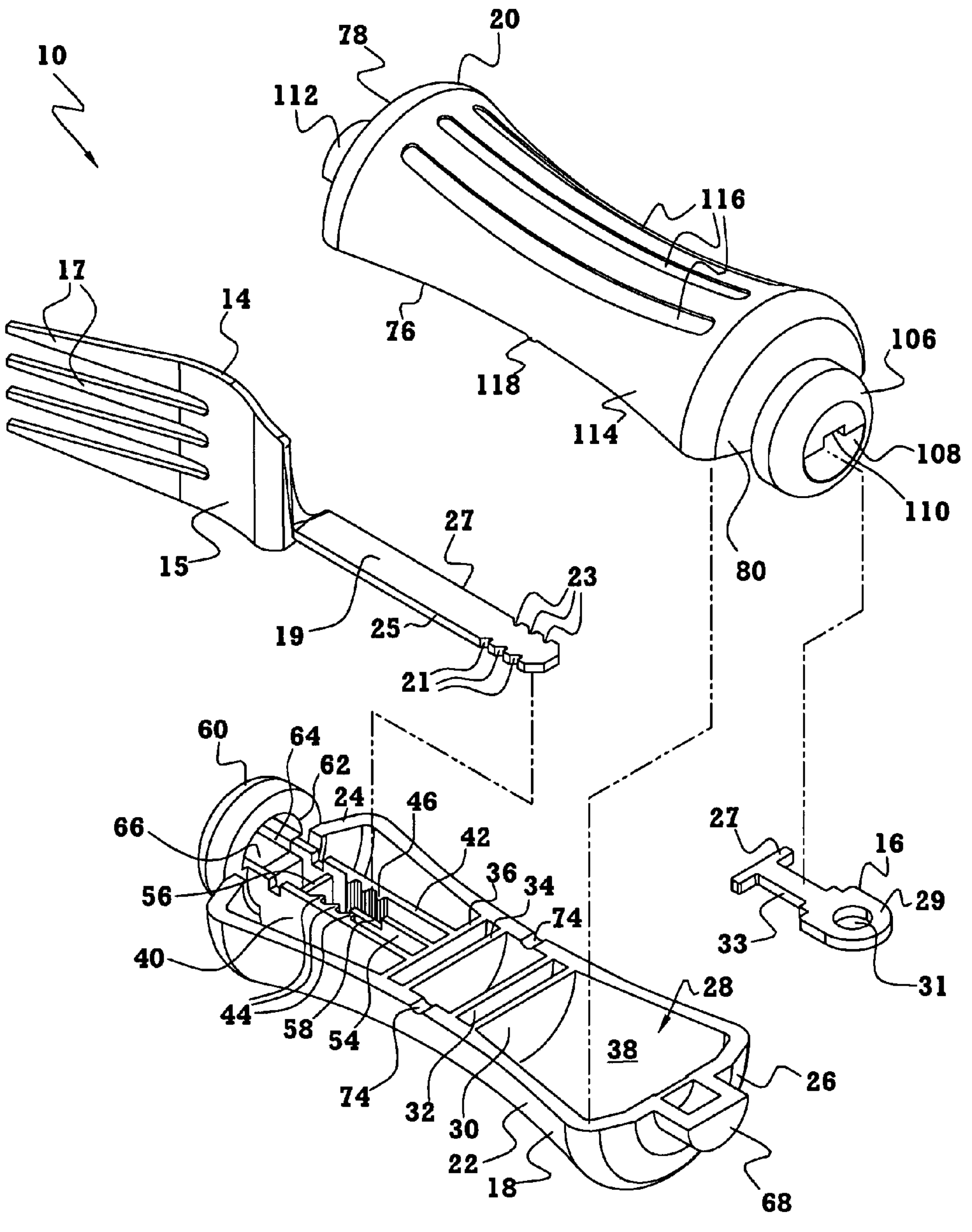
FIG. 3 is a rear exploded isometric view of the eating utensil.
Figure 4:
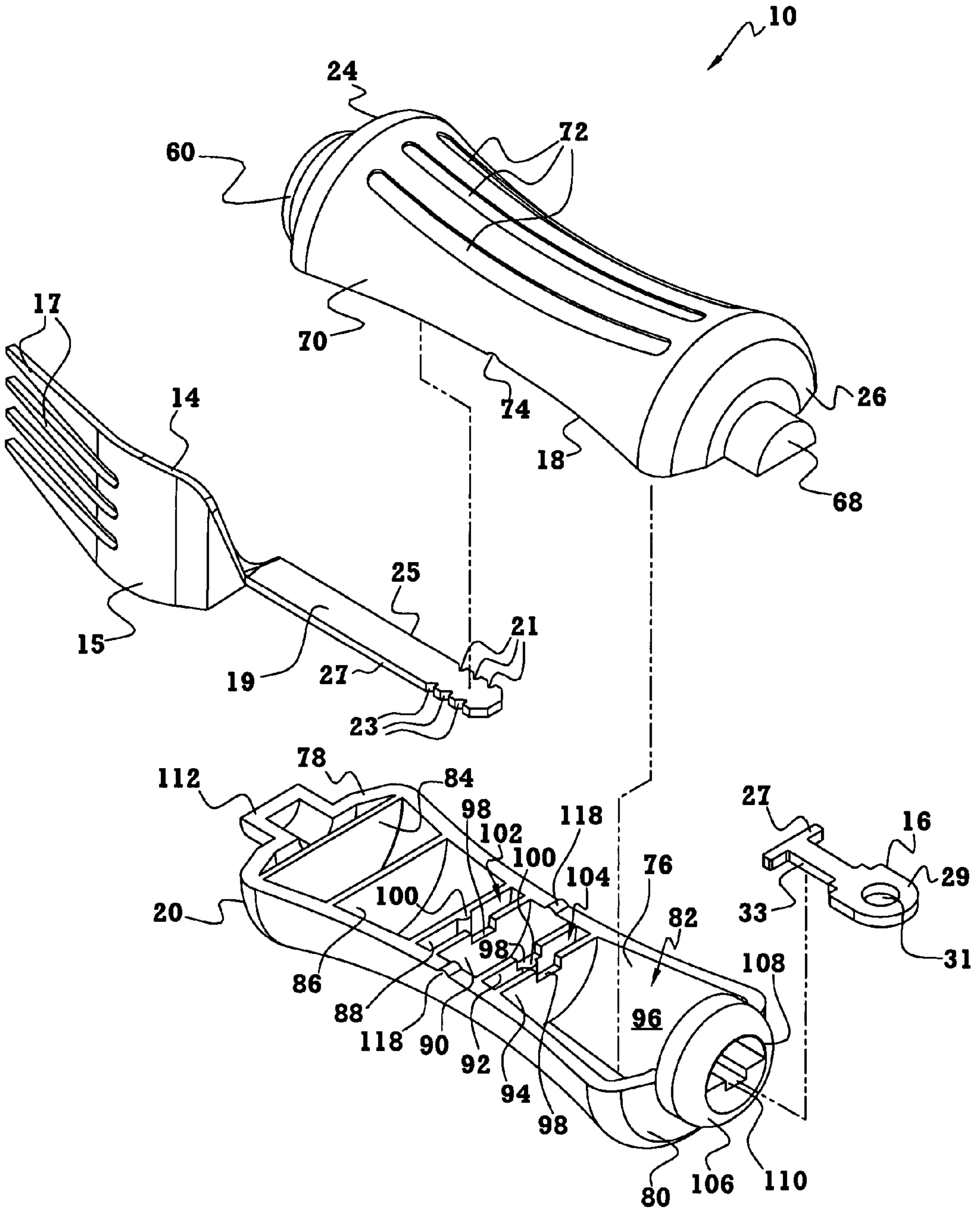
FIG. 4 is a view similar to FIG. 3 with the eating utensil turned 180 degrees about its longitudinal axis.

As best shown in FIGS. 3 and 4, the first handle section 18 preferably includes an elongate, curved side wall 22 of generally semi-hourglass shape, a front wall 24 and a rear wall 26 associated with the forward and rearward ends, respectively, of the side wall 22, to form a hollow interior 28. Cross ribs 30, 32, 34 and 36 are preferably dispensed in the hollow interior 28 and extend laterally across the side wall 22 to strengthen the first handle section 18 against lateral forces as well as for other purposes described below. The cross-ribs 30-36 extend from the inner surface 38 of the side wall 22 and are thus semi-circular in shape to reflect the inner curvature of the side wall. A first holding mechanism member, which preferably contains spaced longitudinal ribs 40, 42 and 54 extend from the cross rib 36 toward the front wall 24 in the plane transverse to the plane of the upper surface of the side wall 22. The ribs 40 and 42 form a receiving arrangement in the form of opposing serrations or teeth 44 and 46, respectively, adapted for receiving an engagement arrangement in the form of corresponding notches 21 and 23 provided in the stem 19 of the utensil insert 14. A cross rib 56 provided forwardly of the receiving/engaging arrangement extends between the longitudinal ribs 40 and 42. The longitudinal rib 54 situated rearwardly of the received engaging arrangement includes a step 58. The cross rib 56 and step 58 are preferably of equal height to support the stem 19 of the utensil insert 14 when installed in the handle 12.

A first securing ring or receptacle 60 extends forwardly from the front wall 24 and includes a semi-circular opening 62 with a channel 64 that is sized to receive the stem 19 of the insert 14. Preferably, a lower surface 66 of the channel 64 is coplanar with an upper surface of the cross rib 56 and the step 58 to support the stem 19 when installed. A first semi-cylindrical securing boss or projection 68 extends rearwardly from the rear wall 26. It will be discussed below that the semi-circular opening 62 of the first securing receptacle is adapted for a locking engagement with the semi-cylindrical securing boss or projection 112 associated with the second handle section 20. Similar locking arrangement exists between the securing boss of the first handle section and the opening of the second securing receptacle. The securing ring 60 and boss 68 are preferably integrally formed with the front and rear walls, respectively, during manufacture to form a unitary structure. However, it will be understood that they may be formed separately and attached through well known connection means such as adhesive bonding, welding, press fitting, mechanical fastening, and so on. It will be further understood that the securing ring and boss may be of any desired shape cooperating with each other.

The outer surface 70 (FIG. 4) of the first handle section 18 preferably includes a plurality of concave features, such as longitudinally extending grooves 72 spaced circumferentially around the side wall 22. The grooves 72 improve the grasping ability especially for users with limited hand dexterity by increasing the surface area of the side wall 22 and providing both inside and outside corners to frictionally engage the user's hand. The side wall 22 also includes spaced depressions 74 positioned between the cross ribs 32 and 34. It will be appreciated that the plurality of concave features are not limited to the longitudinally extending grooves 72 but may include circumferentially extending grooves, spiral grooves, hollows, slits, dimples, nubs, or any other concave and/or convex feature which enhances the ability of a user to grasp and manipulate the eating utensil 10.

The second handle section 20 preferably includes an elongate, curved side wall 76 of generally semi-hourglass shape. A front wall 78 and a rear wall 80 are associated with the forward and rearward ends, respectively, of the side wall 76, to form a hollow interior 82. Cross ribs 84, 86, 88, 90, 92, and 94 are preferably formed in the hollow interior 82 and extend laterally across the side wall 76, and transverse to the plane of the upper surface of the side wall 76. This arrangement strengthens the second handle section 20 against lateral forces and accomplishes other functions which will be discussed later. The cross-ribs 84-94 extend from the inner surface 96 of the side wall 76 and are semi-circular in shape to accommodate the curvature of the side wall 76 as well as for other purposes. A second holding mechanism includes a respective receiving arrangement in the form of a notch 98 formed each rib 90, 92 and 94 and a semi-cylindrical projections 100 that extends from each rib 88 and 92 into a space 102 between the ribs 88, 90 and a space 104 between the ribs 92, 94 for a purpose to be described in greater detail below.

A second securing ring or receptacle 106 extends outwardly from the rear wall 80 and includes a semi-circular opening 108 with a channel 110 that is sized to receive the stem 33 of the tab insert 16. Preferably, the height of the channel 110 is approximately equal to the thickness of the stem 33. A second semi-cylindrical securing boss or projection 112 extends forwardly from the front wall 78. The securing ring 106 and boss 112 are preferably integrally formed with the rear and front walls, respectively, during manufacture. However, it will be understood that they may be formed separately and attached through well known connection means such as adhesive bonding, welding, press fitting, mechanical fastening, and so on to form a unitary structure. It will be further understood that the securing ring and boss may be of any desired shape.

As with the first handle section 18, the outer surface 114 (FIG. 3) of the second handle section 20 preferably includes a plurality of concave features, such as longitudinally extending grooves 116 spaced circumferentially around the side wall 76 to enhance gripping. The side wall 76 also includes spaced projections or dimples 118 (FIG. 3 and 4) positioned between the cross ribs 90 and 92. It will be appreciated that the plurality of concave features are not limited to the longitudinally extending grooves 116 but may include circumferentially extending grooves, spiral grooves, hollows, slits, dimples, nubs, or any other concave and/or convex feature which enhances the ability of a user to grasp and manipulate the eating utensil 10.

The first and second handle sections 18, 20 including their various components are is preferably constructed of an FDA approved injection moldable polymer with sufficient rigidity to hold its shape during assembly and use. The utensil insert 14 and tab insert 16 may be constructed of the same material as the handle sections. It will be understood that the handle sections and/or the inserts may be constructed of other materials, such as ceramic, metal such as stainless steel, elastomeric materials, other plastics, and so on.

Figure 5:
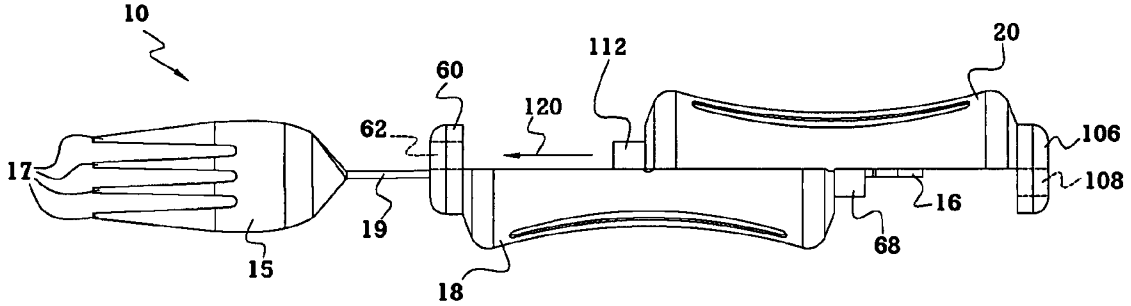
FIG. 5 is a side elevational view of the eating utensil during assembly.
Figure 6:
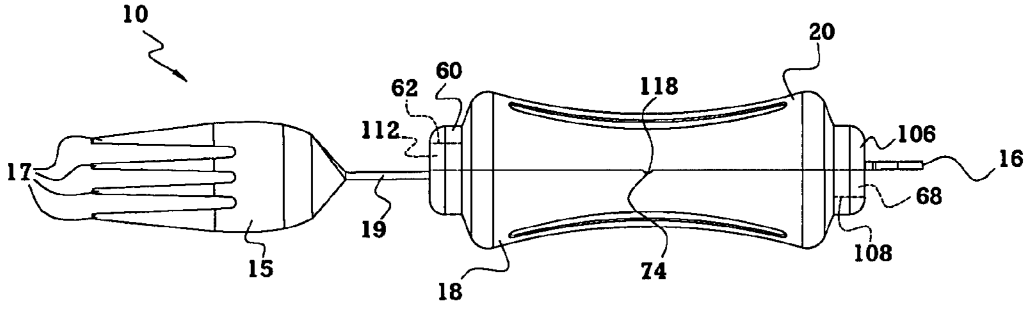
FIG. 6 is a side elevational view of the assembled eating utensil.
Figure 7:
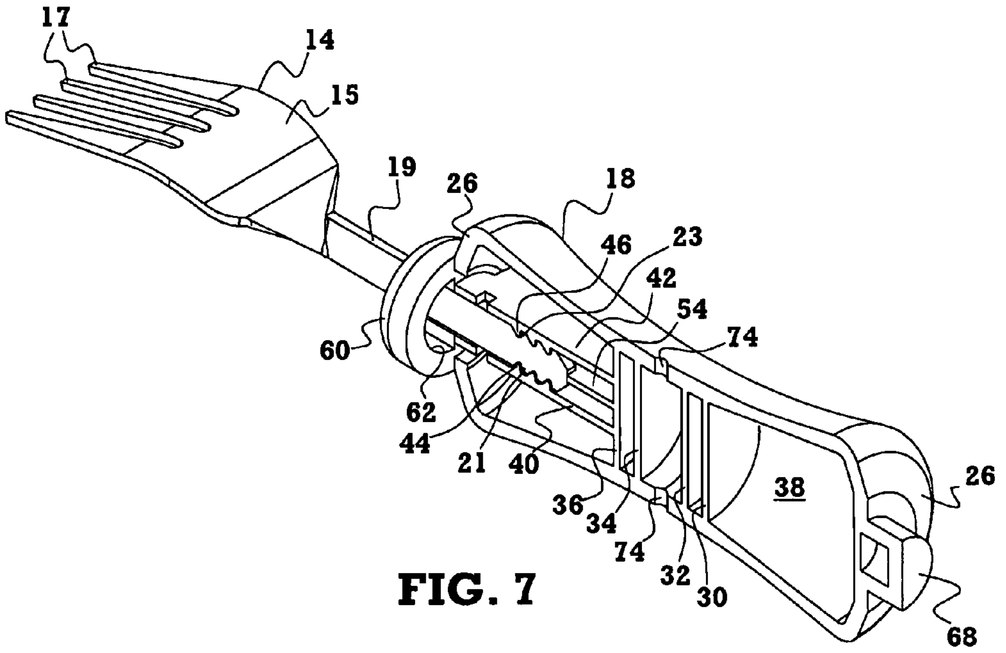
FIG. 7 is a rear isometric view of a first handle section and a first utensil insert connected to the first handle section in accordance with the invention.

With additional reference to FIGS. 5-7, the eating utensil 10 is assembled by inserting the stem 25 of the utensil insert 14 through the opening 62 of the first securing ring 60 of the first handle section 18 until the notches 21 and 23 are aligned with the teeth 44 and 46, respectively, of the first handle section 18. The stem 25 is then pressed into the channel 64 until the notches 21, 23 engage the teeth 44, 46, as shown in FIG. 7. In the assembled position the top surface of the stem 25 is at the level of a top area of the longitudinal ribs 40, 42 and 54 of the first holding mechanism. In a similar manner, the top surface of the stem 25 does not extend beyond the channel 64. Due to the provision of a plurality of notches and teeth, the utensil insert 14 may be adjusted to extend longitudinally at different lengths from the handle 12 according to different user requirements. As to the second handle section 20, the stem 33 of the tab insert 16 is positioned in the channel 110 such that the cross member 27 is adjacent the inner surface of the rear wall 80 and the ring member 29 extends rearwardly from the rear wall.

As illustrated in FIGS. 5 and 6 in order to assemble the utensil, the first and second handle sections 18 and 20 are placed together, so that there respective interior areas at least partially face each other. Then the handle sections are slid relative to each other as represented by the arrow 120 (FIG. 5). The sliding motion is carried out until the semi-cylindrical boss 112 of the second handle section 20 is placed within the semi-circular opening of the first handle section. Simultaneously, the semi-cylindrical boss 68 of the first handle section 18 is positioned within the opening 108 of the second handle section 20. In this manner, the bottom surface of the boss 112 is positioned against the top surface of the stem 19 of the respective utensil insert, whereas the top semi-circular surface of the boss 112 engages the corresponding semi-circular opening 62 of the receptacle 60. In the assembled condition (see FIG. 6) the spaced dimples 118 of the second handle section engage the spaced depressions 74 of the first handle section. In this manner, the handle sections are operationally locked together to thereby temporarily secure the utensil insert 14 and tab insert 16 within the handle 12.

Figure 8:
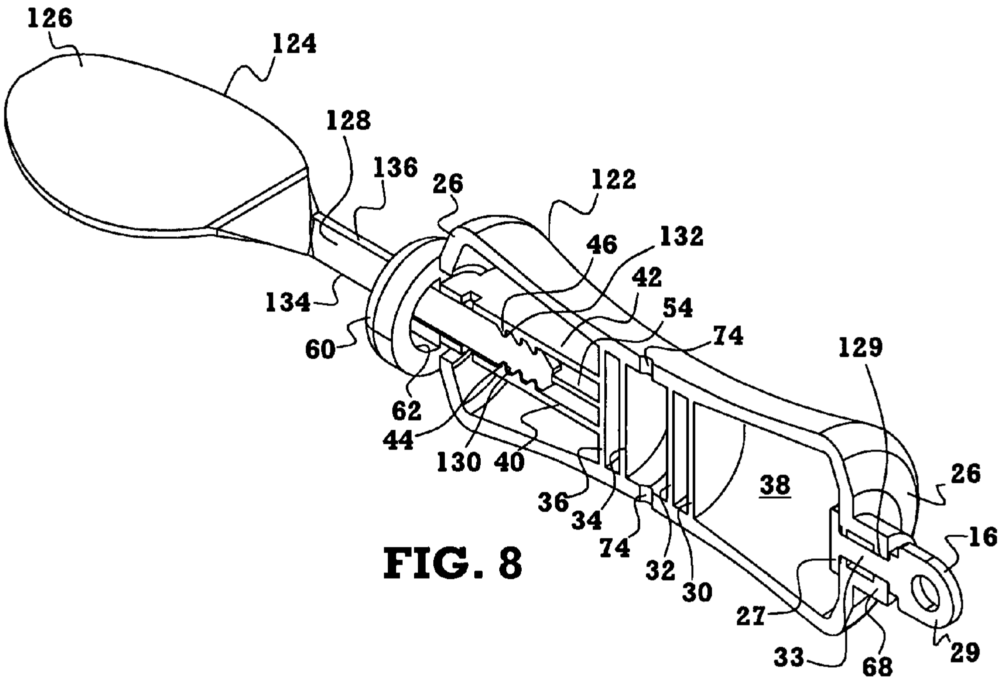
FIG. 8 is a rear isometric view of a first handle section and a second utensil insert and tab insert connected to the first handle section in accordance with a further embodiment of the invention.

Referring now to FIG. 8, wherein a first handle section 122 and utensil insert 124 in accordance with a further embodiment of the invention is illustrated. As shown, the utensil insert 124 is in the form of a spoon with a complex curved plate member 126 a stem 128 extending rearwardly from the plate member. A plurality of notches 130 and 132 are formed within the longitudinal edges 134 and 136, respectively, of the stem 128 engagement with the teeth 44, 46 of the first holding mechanism. As with the utensil insert 14, the plate member 126 of the utensil insert 124 is preferably angled approximately 90 degrees with respect to the stem 19. However, it will be understood that the plate member and stem may be oriented at other angles or may extend in the same direction depending on the particular requirements of the end user.

The first handle section 122 is similar in construction to the first handle section 18 previously described, with the exception that a longitudinal channel 129 is formed in the securing boss or projection 68 for receiving the stem 33 of the tab insert 16. With this arrangement, both the tab insert 16 and one of the utensil inserts 14, 124 can be installed in the first handle section 18 prior to attaching the second handle section 20 in a manner discussed above. Although a spoon-like insert 124 is shown, it will be understood that other inserts, such as knives, tools, or other objects can be formed with a similar stem configuration for use with the handle.

Figure 9:
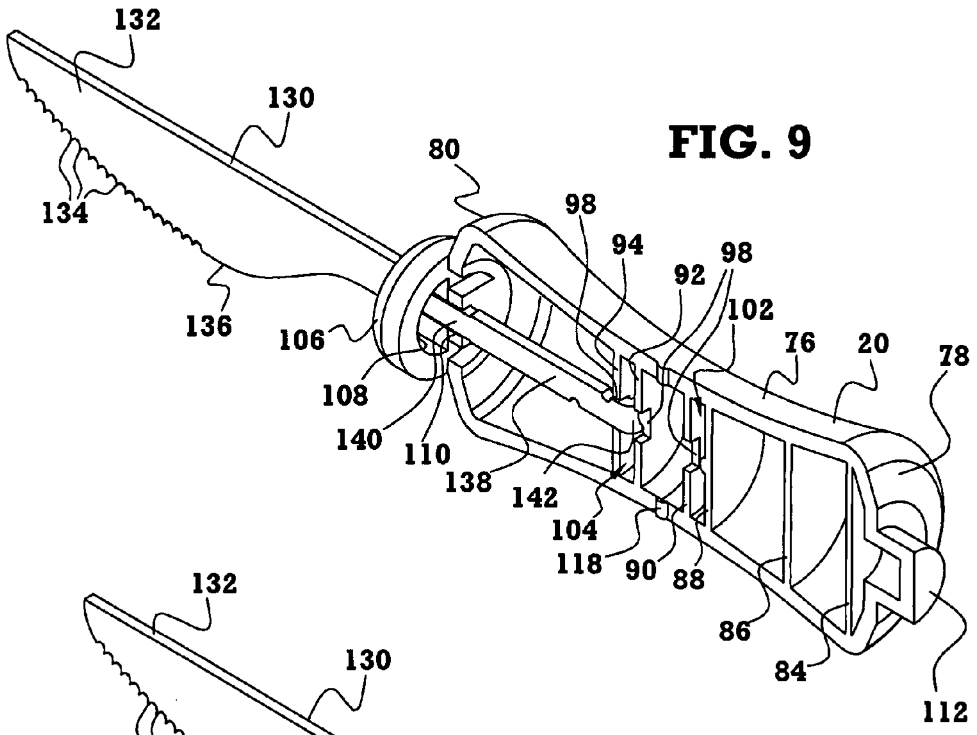
FIG. 9 is a rear isometric view of a second handle section and a further utensil insert connected to the second handle section in accordance with the invention.
Figure 10:
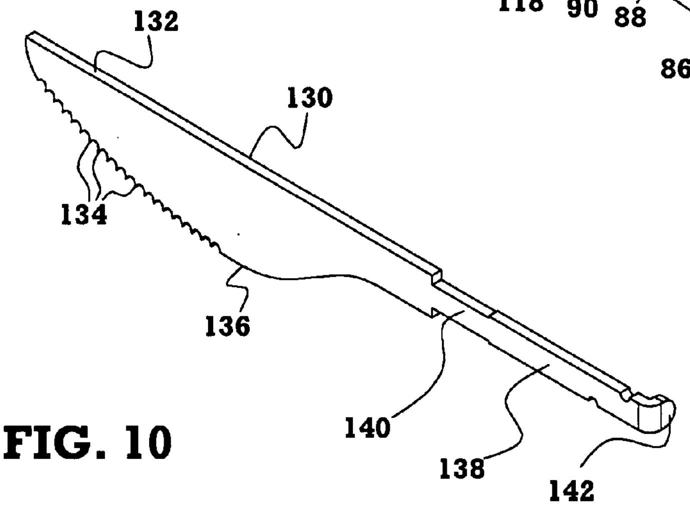
FIG. 10 is a rear isometric view of the third utensil insert.
Figure 11:
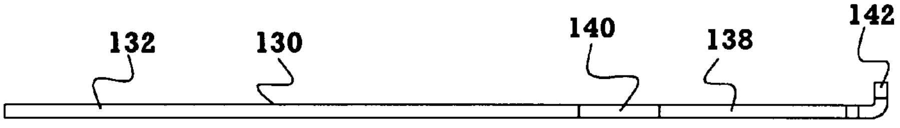
FIG. 11 is a top plan view of the third utensil insert.

Referring now to FIGS. 9-11, a utensil insert 130 in accordance with the invention is connectable to the second handle section 20. The utensil insert 130 preferably includes a plate member 132 with serrations 134 formed along a lower edge 136 thereof and a stem 138 extending rearwardly from the plate member 132. The stem 138 can be formed with a reduced segment 140 that is sized to be received within the channel 110 of the opening 108 of the second handle section 20. A hook segment 142 that is received within the space 102 between the cross ribs 88, 90 or within the space 104 between the cross ribs 92, 94. Preferably, each projection 100 is sized so that the hook segment 142 is frictionally received and temporarily locked within one of the spaces 102 or 104. In this manner, the longitude extension of the plate member 132 can be adjusted with respect to the second handle section 20. The first and second handle sections 18, 20 can then be assembled together as previously described. If desired, another utensil insert, such as inserts 14 or 124 having a stem 138, can be installed on the second handle section 20 instead of the utensil insert 130 prior to connecting the sections together so that the utensil inserts extend from opposite ends of the handle 12.

Although a knife-like insert 130 is shown, it will be understood that other inserts, such as forks, spoons, tools, or other objects can be formed with a similar stem configuration for use with the handle 12.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

What is claimed is:

1. A utensil for a manually impaired user, the utensil comprising:

at least one utensil insert;

a handle for receiving said at least one utensil insert so that a portion of the utensil insert extends outwardly from the handle, the handle including first and second handle sections removably connected together;

said at least one utensil insert including a first utensil insert having a first stem and a second utensil insert having a second stem the first handle section having a first receptacle and a first projection spaced from the first receptacle; and the second handle section having a second receptacle and a second projection spaced from the second receptacle; wherein the first receptacle is adapted to receive the second projection and the second receptacle is adapted to receive the first projection when the first and second handle sections are connected together in formation of the handle, wherein the first receptacle comprises a channel for receiving a first stem and a first holding mechanism comprises spaced from each other longitudinally extending ribs within the first handle section, each rib having teeth for engaging corresponding notches formed on the first stem; and wherein the second handle section having a second receptacle and a second projection spaced from the second receptacle; wherein the first receptacle is adapted to receive the second projection and the second receptacle is adapted to receive the first projection when the first and second handle sections are connected together in formation of the handle, wherein the first receptacle comprises a channel for receiving the first stem, and the first handle section comprises a first holding mechanism, the first holding mechanism comprises two spaced from each other longitudinally extending ribs within the first handle section, each rib having teeth for engaging corresponding notches formed on the first stem; and wherein the second receptacle comprises a channel for receiving the second stem, and the second handle section comprises a second holding mechanism, the second holding mechanism comprises at least one pair of spaced from each other cross ribs extending transversely to a longitudinal axis of the second handle section, the second utensil insert further comprises a hook segment associated with the second stem, the hook segment extends into a space between said at least one pair of cross ribs.

2. The utensil according to claim 1, wherein the first stem is adjustable within the first holding mechanism with respect to the first handle section to thereby adjust an extended length of the first utensil insert portion with respect to the handle.

3. The utensil according to claim 2, wherein the first stem extends through the first receptacle of the first handle section.

4. The utensil according to claim 1, wherein the first utensil insert comprises at least one of a fork, spoon and knife insert.

5. The utensil according to claim 1, wherein the second stem is adjustable with respect to the second handle section to thereby adjust an extended length of the second insert portion with respect to the handle.

6. The utensil according to claim 1, wherein the second stem extends through the second receptacle of the second handle section.

7. The utensil according to claim 1, wherein the second insert comprises at least one of a fork, spoon and knife insert.

8. The utensil according to claim 1, wherein each of said first and second handle sections comprise front and rear walls and an arcuate side wall extending between the front and rear walls.

9. The utensil according to claim 8, wherein the first receptacle and first projection are formed in the front and rear walls, respectively, of the first handle section.

10. The utensil according to claim 9, wherein the second receptacle and second projection are formed in the rear and front walls, respectively, of the second handle section.

11. The utensil according to claim 10, wherein each receptacle comprises an opening and each projection comprises an elongated boss adapted for locking engagement with the respective opening.

12. The utensil according to claim 11, wherein in an assembled condition of the utensil the elongated bosses are received within the respective openings to thereby temporarily secure the respective utensil inserts within the handle portion and to secure the first and second handle sections together.

13. The utensil according to claim 12, and further comprising a pair of spaced dimples extending from the side wall of one of the first and second handle sections and a pair of corresponding depressions formed on the side wall of the other of the first and second handle sections, the dimples being received in the depressions minimizing longitudinal motion of the handle sections relative each other in the assembled condition of the utensil.

14. The utensil according to claim 1, further comprising an auxiliary insert including a cross member located at one end of a stem and a ring member located at an opposite end of the stem, the cross member is positioned within interior of the handle, whereas the ring member extends outwardly from the handle.

15. The utensil according to claim 1, wherein the first stem is further secured within the first holding mechanism and the channel of the first receptacle when the respective receptacles and projections are engaged upon formation of the handle.

16. The utensil according to claim 1, wherein the second stem is further secured within the second holding mechanism and the channel of the second receptacle when the respective receptacles and projections are engaged upon formation of the handle.

* * * * *